US008873832B2

(12) United States Patent
Shin et al.

(10) Patent No.: US 8,873,832 B2
(45) Date of Patent: Oct. 28, 2014

(54) SLIP DETECTION APPARATUS AND METHOD FOR A MOBILE ROBOT

(75) Inventors: Kyung Chul Shin, Seoul (KR); Seong Ju Park, Incheon (KR); Hee Kong Lee, Seoul (KR); Jae Young Lee, Gyeonggi-do (KR); Hyung O Kim, Gyeonggi-do (KR); James Stonier Daniel, Seoul (KR)

(73) Assignee: Yujin Robot Co., Ltd., Seoul (KR)

( * ) Notice: Subject to any disclaimer, the term of this patent is extended or adjusted under 35 U.S.C. 154(b) by 206 days.

(21) Appl. No.: 13/504,510

(22) PCT Filed: Oct. 30, 2009

(86) PCT No.: PCT/KR2009/006367
§ 371 (c)(1),
(2), (4) Date: Apr. 27, 2012

(87) PCT Pub. No.: WO2011/052827
PCT Pub. Date: May 5, 2011

(65) Prior Publication Data
US 2012/0219207 A1   Aug. 30, 2012

(30) Foreign Application Priority Data
Oct. 30, 2009   (KR) .................. 10-2009-0104168

(51) Int. Cl.
*G06K 9/32*   (2006.01)
*G06F 19/00*   (2011.01)
*B25J 9/16*   (2006.01)

(52) U.S. Cl.
CPC ............... *B25J 9/1697* (2013.01); *B25J 9/162* (2013.01); *Y10S 901/01* (2013.01)
USPC ............... 382/153; 382/297; 700/245; 901/1

(58) Field of Classification Search
USPC ................. 382/153, 151, 107, 274, 305, 297; 702/75, 85, 151; 180/8.1, 8.5, 8.7, 180/9.32; 700/90, 245, 258, 253; 901/1, 46, 901/28, 29, 33, 40; 318/560, 567, 568.1, 318/568.11, 568.12, 568.21
See application file for complete search history.

(56) References Cited

U.S. PATENT DOCUMENTS 7,187,999 B2 *  3/2007  Okamoto et al. ............. 700/245
8,165,717 B2 *  4/2012  Kim et al. .................... 700/259
(Continued)

FOREIGN PATENT DOCUMENTS

| JP | 10-055215 A | 2/1998 |
| JP | 2001277159 | 10/2001 |
| JP | 2005-022040 A | 1/2005 |
| JP | 2005-222226 A | 8/2005 |

(Continued)

OTHER PUBLICATIONS

Ohya et al., vision-based navigation by a mobile robot with obstacle avoidance using single-camera vision and ultrasonic sensing, (IEEE transaction on robotics and automation vol. 14, and Dec. 16, 1998, pp. 969-978).*

*Primary Examiner* — Sheela Chawan
(74) *Attorney, Agent, or Firm* — Husch Blackwell LLP (57) ABSTRACT

The present invention relates to a slip detection apparatus and method for a mobile robot, and more particularly, to a slip detection apparatus and method for a mobile robot, which not only use a plurality of rotation detection sensors to detect a lateral slip angle and lateral slip direction, but also analyze the amount of change in an image and detect the blocked degree of an image input unit to determine the quality of an input image, and detect the occurrence of a frontal slip to precisely detect the type of slip, direction of the slip, and the rotation angle, and, on the basis of the latter, to enable the mobile robot to move away from and avoid slip regions, and to reassume the precise position thereof.

17 Claims, 7 Drawing Sheets

(56) References Cited

U.S. PATENT DOCUMENTS

2008/0065267 A1* 3/2008 Hong et al. .................. 700/245
2008/0154429 A1* 6/2008 Lee et al. ..................... 700/258
2008/0188984 A1 8/2008 Harwig et al.

FOREIGN PATENT DOCUMENTS

| JP | 2005-327238 A | 11/2005 |
| JP | 2006-068884 A | 3/2006 |
| WO | 2008096500 A1 | 8/2008 |

* cited by examiner

SLIP DETECTION APPARATUS AND METHOD FOR A MOBILE ROBOT

CROSS REFERENCE TO RELATED APPLICATIONS

This application is a U.S. National Phase Application of International Application PCT Application No. PCT/KR2009/006367 filed on Oct. 30, 2009, which claims the benefit of priority from Korean Patent Application No.10-2009-0104168 filed on Oct. 30, 2009. The disclosures of International Application PCT Application No. PCT/KR2009/006367 and Korean Patent Application No.10-2009-0104168 are incorporated herein by reference.

TECHNICAL FIELD

The present invention relates to an apparatus and a method for detecting slips of a mobile robot. More specifically, the present invention relates to an apparatus and a method for detecting slips of a mobile robot capable of accurately detecting slips generated during a heading of a mobile robot by using a plurality of direction sensors and a single image sensor, controlling the heading of the mobile robot based on the detected slips so as to escape a danger zone, and recovering a location of the mobile robot that is falsely recognized due to the slip.

BACKGROUND ART

Recently, as a robot technology is developed, a use of a mobile robot setting its own path and moving along the set path has been increased. A representative example of the mobile robot may include a cleaning robot cleaning the inside of a house or a building, a guide robot guiding location, and the like. In particular, the cleaning robot cleans an indoor floor using a vacuum cleaning unit provided therein while moving including various sensors and heading units. Currently, various types of cleaning robots have been commercialized.

There is a need to build a map for a space in which mobile robots move and allow the mobile robots to recognize their own locations in the space in order for these mobile robots to effectively determine their own locations in the space and move to the determined locations. Allowing the mobile robot to recognize its own location with respect to a surrounding space and build a map is referred to as simultaneous localization and mapping (SLAM).

Among the SLAM mechanisms, an image based SLAM builds a map for the surrounding environment using visual features extracted from an image and estimates a posture of robot. Generally, the mobile robot is headed based on dead reckoning by using a gyroscope and an encoder provided in a driving motor and analyzes an image using a camera mounted at a top thereof and build a map. In this case, when an error occurs due to odometry from the gyroscope and the encoder, an accumulated error is corrected by using image information acquired from the camera.

The mobile robot according to the related art as described above does not effectively escape the slip region or accurately detect a slip angle and a direction when the slips are generated during the heading of the mobile robot.

DISCLOSURE

Technical Problem

The present invention has been made in an effort to provide an apparatus and a method for detecting slips of a mobile robot capable of detecting a slip angle and a slip direction at the time of a side slip, determining a type of slips by detecting a front slip, escaping a slip region by different methods according to a type of slips, and recovering an accumulated error by estimating the generated slip direction and time.

Technical Solution

An exemplary embodiment of the present invention provides an apparatus for detecting slips of a mobile robot, including: a first rotation angle estimating unit that estimates a first rotation angle estimated that the mobile robot rotates; a second rotation angle measuring unit that measures a second rotation angle generated by an actual rotation of the mobile robot; an image variation calculating unit that calculates variations of at least two sequential images acquired from an image acquisition unit; and a sling detecting unit that detects a type of slips by calculating a slip direction and a slip angle of the mobile robot based on an error angle of the first and second rotation angles and the image variations and outputs different escape control signals for allowing the mobile robot to escape a slip region according to the type of detected slips.

The slip detecting unit may output a recovery signal of a location of the mobile robot for the error of location information at the time of the slip generation based on the slip direction, the slip angle, and the image variations.

The slip detecting unit may detect a generation of a first slip in the mobile robot when the error angle is larger than a reference error angle.

The slip detecting unit may determine that a slip is generated at a right wheel of the mobile robot when a sign of the error angle has a negative value at the time of detecting the slip and output an escape control signal that allows the mobile robot to move backward by a predetermined distance or for a predetermined time and then, move forward in a left direction.

The slip detecting unit may determine that a slip is generated at a left wheel of the mobile robot when a sign of the error angle has a positive value at the time of detecting the slip and output an escape control signal that allows the mobile robot to move backward by a predetermined distance or for a predetermined time and then, move forward in a right direction.

The slip detecting unit may compare the image variations with reference variations to estimate that the mobile robot is congested when the image variations are smaller than the reference variations, thereby calculating a congested frequency.

The slip detecting unit may detect a generation of a second slip when the congested frequency is larger than a reference frequency and a speed of the mobile robot based on the error angle is larger than a reference speed.

Another exemplary embodiment of the present invention provides a method for detecting slips of a mobile robot, including: a) estimating a first rotation angle estimated that the mobile robot rotates; b) measuring a second rotation angle generated by an actual rotation of the mobile robot; and c) detecting a first slip by obtaining an error angle of the first rotation angle and the second rotation angle and calculating a slip direction and a slip angle of the mobile robot based on the error angle.

The method may further include: d) detecting a second slip by calculating variations of at least two sequentially input images.

The method may further include: e) detecting a type of slips based on the detected first slip and second slip and selectively escaping a slip region according to the type of detected slips.

The method may further include: f) recovering a location of the mobile robot based on the slip direction, the slip angle, and the image variations.

The estimating of the first rotation angle may include: detecting a first angular velocity that is a rotation speed of a left wheel driving unit of the mobile robot and a second angular velocity that is a rotation speed of a right wheel driving unit; and calculating the first rotation angle based on a difference between the first angular velocity and the second angular velocity and a diameter of a wheel of the mobile robot.

The detecting of the first slip may include: obtaining an error angle between the first rotation angle and the second rotation angle and comparing the error angle with a reference error angle; and determining that a slip is generated in the mobile robot when the error angle is larger than the reference error angle to allow the mobile robot to escape the slip region.

In the escaping of the slip region, the mobile robot may move backward by a predetermined distance or for a predetermined time and then, move forward in a direction opposite to the slip direction so as to escape the slip region.

In the escaping of the slip region, the mobile robot may move backward by a predetermined distance or for a predetermined time and then, move forward in a left direction so as to escape the slip region by determining that a slip is generated at a right wheel of the mobile robot when a sign of the error angle has a negative value.

In the escaping of the slip region, the mobile robot may move backward by a predetermined distance or for a predetermined time and then, move forward in a right direction so as to escape the slip region by determining that a slip is generated at a left wheel of the mobile robot when a sign of the error angle has a positive value.

The error angle may have a value between +180° and −180° based on an initial position of the mobile robot.

When the error angle has a discontinuous period for the moving time of the mobile robot, an error angle of the discontinuous period may move in a y-axis direction in parallel to pre-process the error angle so that the discontinuous period is a continuous period.

The detecting of the second slip may include: dividing the input image into N regions and increasing an object region by 1/N based on a heading direction or an opposite direction of the mobile robot to calculate an average and a variance of each increased region; and estimating that the input image is congested to calculate a congested frequency when the image variations is smaller than reference variations if it is determined that the image is not shielded based on the variations of the average and variance values of each region.

In the detecting of the second slip, when the congested frequency is larger than a reference frequency and a speed of the mobile robot is larger than a reference speed based on the error angle, the generation of the second slip may be detected.

The generation of the second slip may be detected, the mobile robot may move backward by a predetermined distance or for a predetermined time and then, may be headed while avoiding the slip generation region.

Advantageous Effects

The apparatus and the method for detecting slips of a mobile robot according to the exemplary embodiments of the present invention can detect a type of slips by detecting the slip angle and the slip direction at the time of the side slip and detecting the front slip.

Further, the apparatus and the method for detecting slips of a mobile robot according to the exemplary embodiment of the present invention can effectively escape the slip region by different methods according to a type of detected slips.

In addition, the apparatus and the method for detecting slips of a mobile robot according to the exemplary embodiment of the present invention can recover the accumulated location error of the mobile robot at the time of the slip generation by estimating the slip direction and time.

BEST MODE

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. Further, hereinafter, exemplary embodiments of the present invention will be described, but the spirit of the present invention is not limited thereto, and various modifications may be made and worked by a person with ordinary skill in the art.

Figure 1:
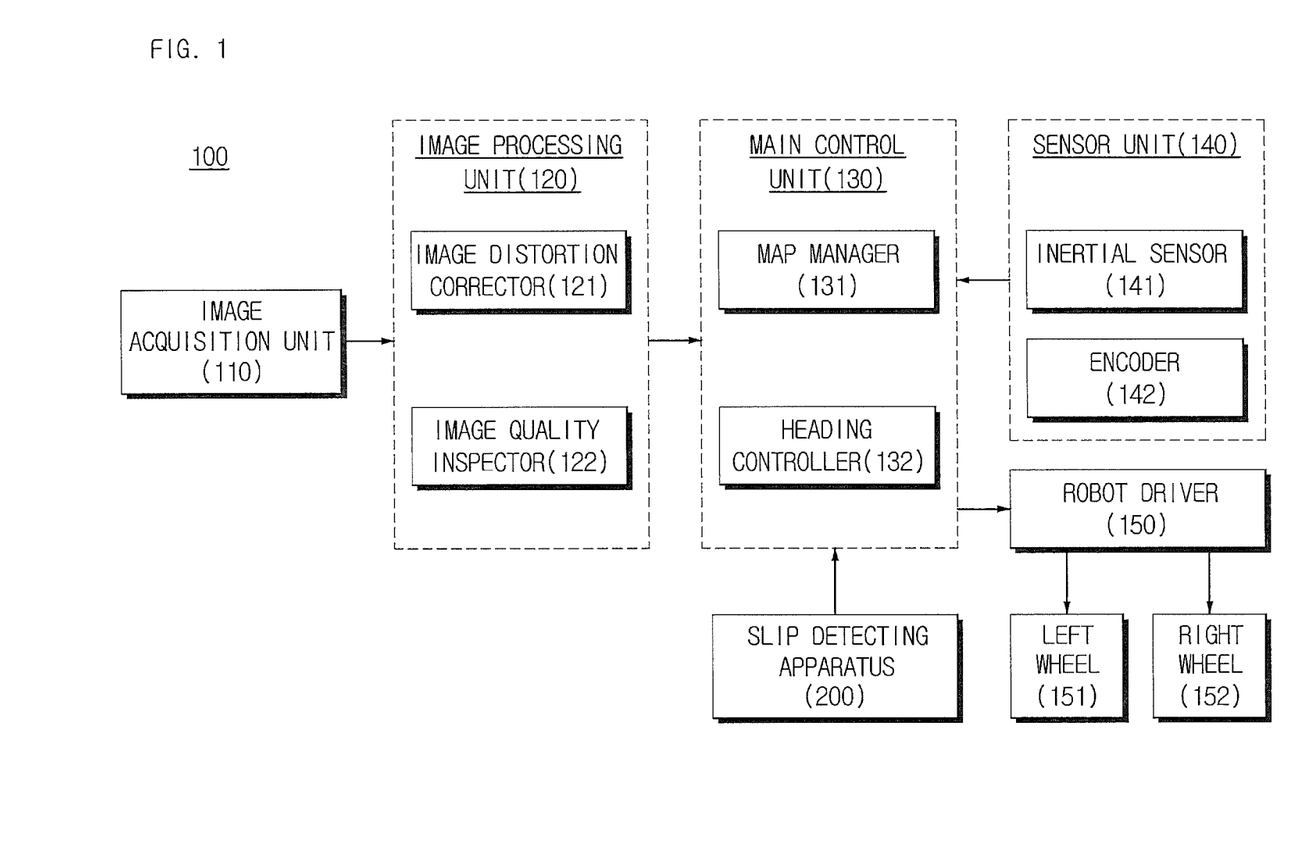
FIG. 1 is a block diagram showing a configuration of a mobile robot to which an exemplary embodiment of the present invention is applied.

FIG. 1 is a diagram showing a configuration of a mobile robot to which an exemplary embodiment of the present invention is applied.

Referring to FIG. 1, a mobile robot 100 according to an exemplary embodiment of the present invention may be configured to include an image acquisition unit 110 that acquires an image, an image processing unit 120 that process the image acquired by the image acquisition unit 110, extracts features from the image, and generates descriptors for the features, a sensor unit 140 that detects moving orientation information, a moving distance, and the like, of the mobile robot 100, a main control unit 130 that builds a map for a space in which the mobile robot moves based on the acquired image and controls an operation of the mobile robot based on information about the features extracted from the acquired image and odometry acquired from the sensor unit 140, a robot driver 150 that drives the robot according to a control of the main control unit 130, and a slip detecting apparatus 200 that detects a slip angle, a slip direction, and a type of slips of the mobile robot to output different escape control signals for escaping a slip region according to the detected type of slips.

The image acquisition unit 110, which is a device acquiring images about surrounding environment in which the mobile robot is located, may be configured to include image sensors, such as a charge coupled device (CCD), a complementary metal oxide semiconductor (CMOS), and the like. In the exemplary embodiment of the present invention, the image acquisition unit 110 is preferably disposed upwardly to acquire a ceiling image. More preferably, the image acquisition unit 110 may include a wide angle lens such as a fisheye lens, and the like, to acquire a wide range of ceiling image.

The image processing unit 120 may be configured to include an image distortion corrector 121 and an image quality inspector 122.

The image distortion corrector 121 serves to correct distortion of the image acquired by the image acquisition unit 110. When the image acquisition unit 110 includes the fisheye lens or the wide angle lens, the image acquired by the image acquisition unit 110 includes radial distortion. Therefore, the image acquisition unit 110 removes the distortion of the image using previously acquired camera parameters.

The image quality inspector 122 serves to determine availability of the acquired image. When direct rays are irradiated to the image acquisition unit 110 or the image acquisition unit 110 is covered with obstacles such as a table, the image acquired by the image acquisition unit 110 may not be appropriate for mobile robot localization. Therefore, the image quality inspector 122 inspects the acquired image and when the acquired image is inappropriate, serves to exclude the inappropriate image. As an example, the image quality inspector 122 may process the acquired image as the inappropriate image when brightness of the acquired image is too high or too low based on the brightness of the acquired image. When the acquired image is excluded, the main control unit 130 may control the movement of the mobile robot 100 based on heading record information acquired from a gyroscope 44 or an encoder 142.

The map manger 131 serves to build and update a map for the space in which the mobile robot 100 is located based on the image acquired by the image acquisition unit 110 of the mobile robot 100, the odometry such as the moving direction and distance of the mobile robot 100, the locations of the features, and the like. In some cases, the map for the space may be provided to the mobile robot 100 in advance. In this case, the map manager 131 may continuously update the map based on the information such as obstacles located in the space and the feature information.

The heading controller 132 serves to control the heading of the mobile robot 100 based on the current location and the odometry of the mobile robot 100. As the exemplary embodiment for heading the mobile robot 100, the mobile robot 100 includes a left wheel 151 and a right wheel 152 and may include a left wheel driving motor (not shown) and a right wheel driving motor (not shown) as the robot driver 150 for driving the left wheel and the right wheel. The heading controller 132 can perform the heading such as forward, backward, left turn, right turn, and the like, of the mobile robot 100 by controlling the rotation of each of the left wheel driving motor and the right wheel driving motor. In this case, the left wheel driving motor and the right wheel driving motor are each provided with the encoders 142 to acquire the driving information about the left wheel driving motor and the right wheel driving motor.

Meanwhile, the heading controller 132 may be designed to control the heading of the mobile robot 100 by predicting the locations of the following features and the location of the mobile robot based on the locations of the current features and the location of the mobile robot by using an extended Kalman filter (EKF).

Hereinafter, an apparatus 200 for detecting slips of a mobile robot according to an exemplary embodiment of the present invention will be described in detail with reference to FIG. 2.

Figure 2:
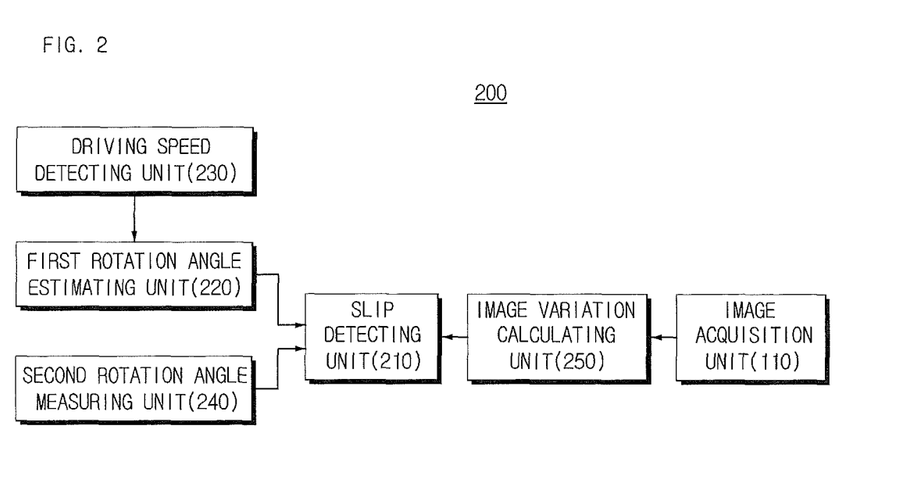
FIG. 2 is a block diagram showing a configuration of an apparatus for detecting slips of a mobile robot according to an exemplary embodiment of the present invention.

FIG. 2 is a block diagram showing a configuration of an apparatus for detecting slips of a mobile robot according to an exemplary embodiment of the present invention.

Referring to FIG. 2, the apparatus 200 for detecting slips of a mobile robot according to an exemplary embodiment of the present invention is configured to include a first rotation angle estimating unit 220 that estimates a first rotation angle estimated as a case in which the mobile robot rotates, a second rotation angle measuring unit 240 that measures a second rotation angle generated by an actual rotation of the mobile robot; an image variation calculating unit 250 that calculates variations of at least two sequential images acquired from the image acquisition unit; and a slip detecting unit 210 that calculates the slip direction and the slip angle of the mobile robot based on an error angle of the first and second rotation angles and the image variations to detect a type of slips and outputs different escape control signals for escaping the slip region according to a type of the detected slips.

The first rotation angle estimating unit 220 receives an angular velocity detected by the driving speed detecting unit 230 that calculates an angular velocity of a rotating axis of the robot driver 150, thereby estimating the first rotation angle.

Here, as the driving speed detecting unit 230, a wheel encoder may be used and as the second rotation angle measuring unit 240, an inertial sensor like a gyroscope may be used. In addition, as the driving speed detecting unit 230 and the second rotation angle measuring unit 240, the encoder 142 and the inertial sensor 141 of the sensor unit 140 may be used as they are. In this case, the estimated first rotation angle becomes a rotation angle estimated by the wheel encoder and the second rotation angle becomes a rotation angle measured by the inertial sensor.

The slip detecting unit 210 outputs a location recovering signal of the mobile robot for error of location information generated at the time of slip based on the slip direction, the slip angle, and the image variation.

The slip detecting unit 210 detects that the side slip occurs in the mobile robot when the error angle is larger than the reference error angle and determines whether a sign of the error angle is positive or negative so as to see in which direction the slip is generated.

The slip detecting unit 210 determines that the slip is generated at the right wheel 152 of the mobile robot when the sign of the error angle has a negative value at the time of the slip detection. When the slip is generated at the right wheel as described above, the slip detecting unit 210 outputs an escape control signal that allows the mobile robot to move backward by a predetermined distance or for a predetermined time and then, move forward in a left direction.

In addition, the slip detecting unit 210 determines that the slip is generated at the left wheel 151 of the mobile robot when the sign of the error angle has a positive value at the time of detecting the slip and the mobile robot outputs the escape control signal that allows the mobile robot to move backward by a predetermined distance or for a predetermined time and then, move forward in a right direction.

Hereinafter, the method for detecting slips of the mobile robot 100 according to the description of the exemplary embodiment of the present invention will be described below with reference to FIGS. 3 to 7.

Figure 3:
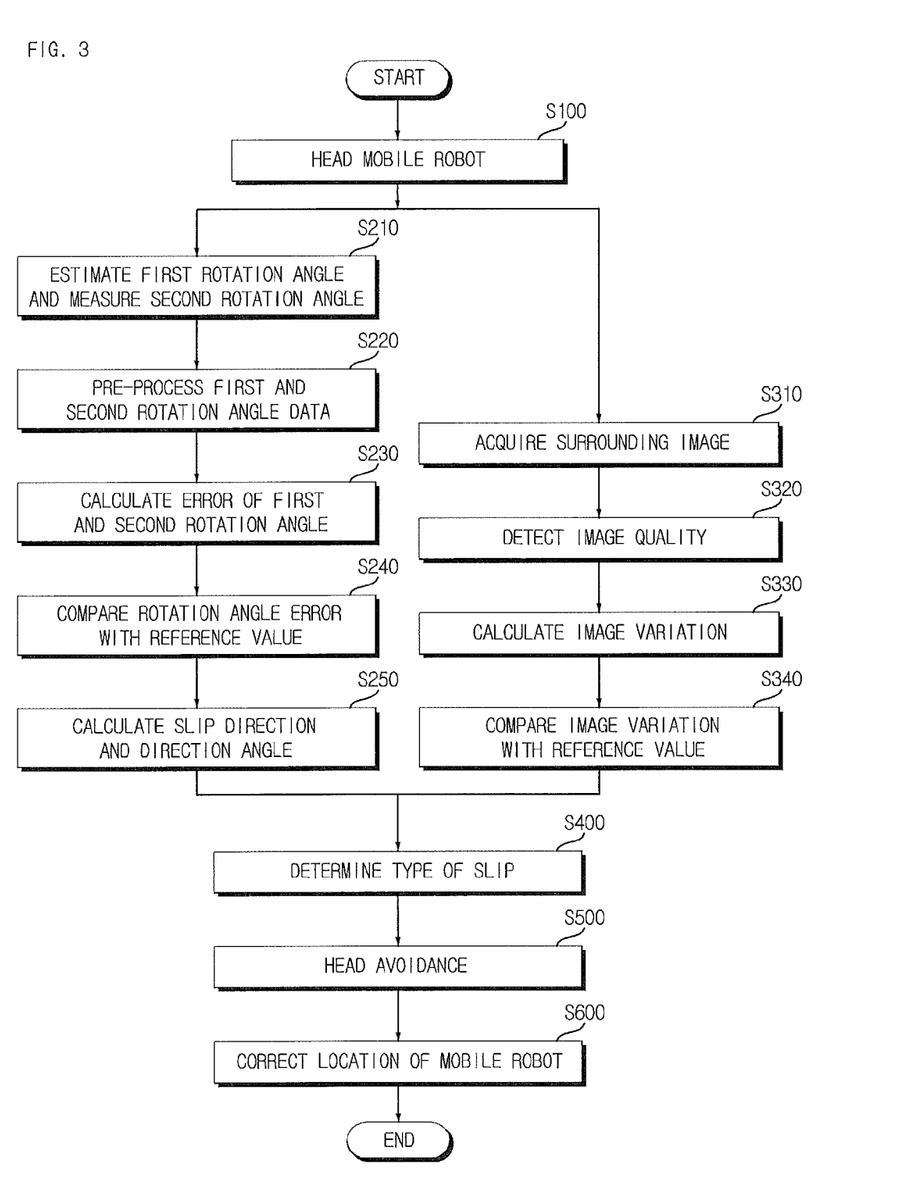
FIG. 3 is a flow chart showing a method for detecting slips of a mobile robot according to an exemplary embodiment of the present invention.
Figure 4:
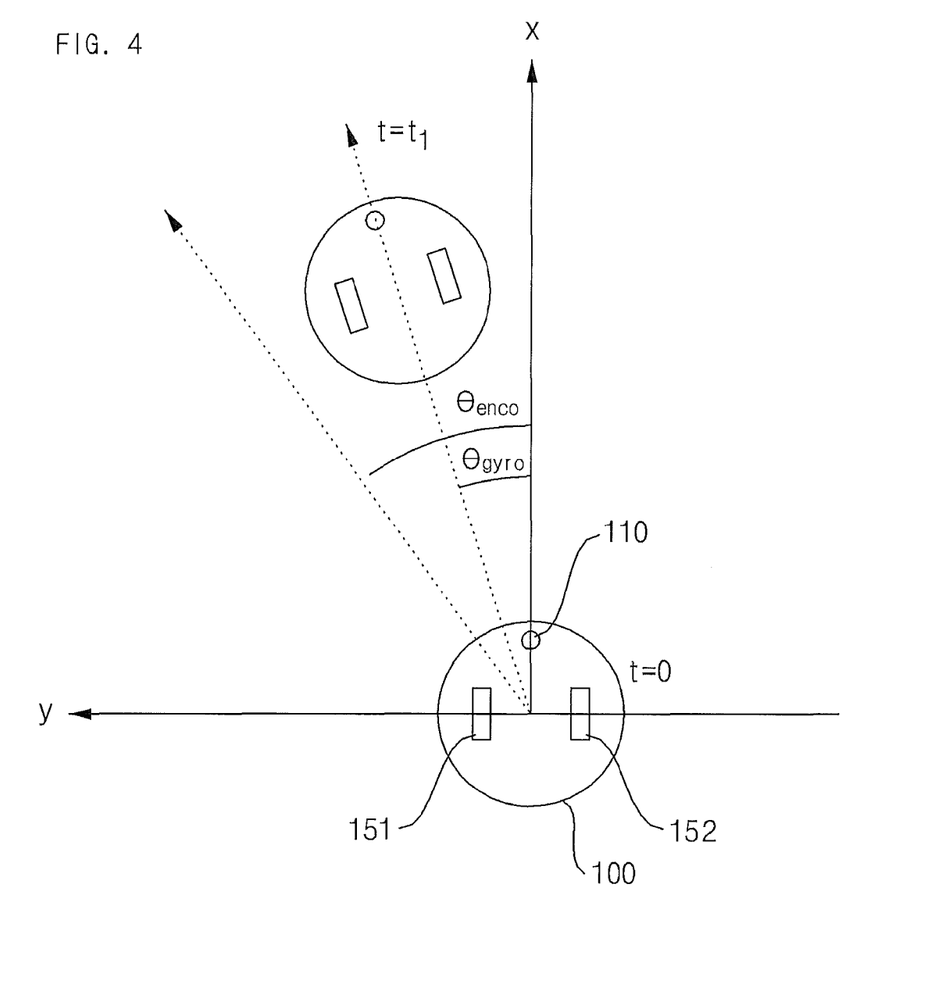
FIG. 4 is a diagram showing a estimated rotation angle and a measured rotation angle when slips are generated at a left wheel at time t1 during a heading of a mobile robot.
Figure 5:
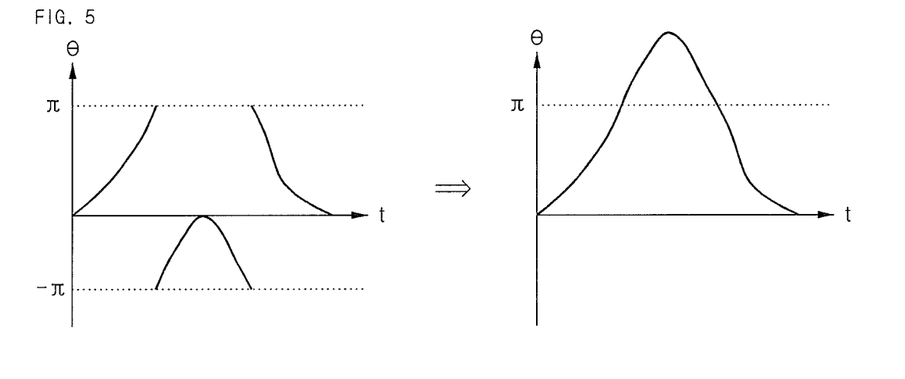
FIG. 5 is a diagram showing a rotation angle data detected by the apparatus and the method for detecting slips of a mobile robot according to the exemplary embodiment of the present invention and data generated by processing the rotation angle data.
Figure 6:
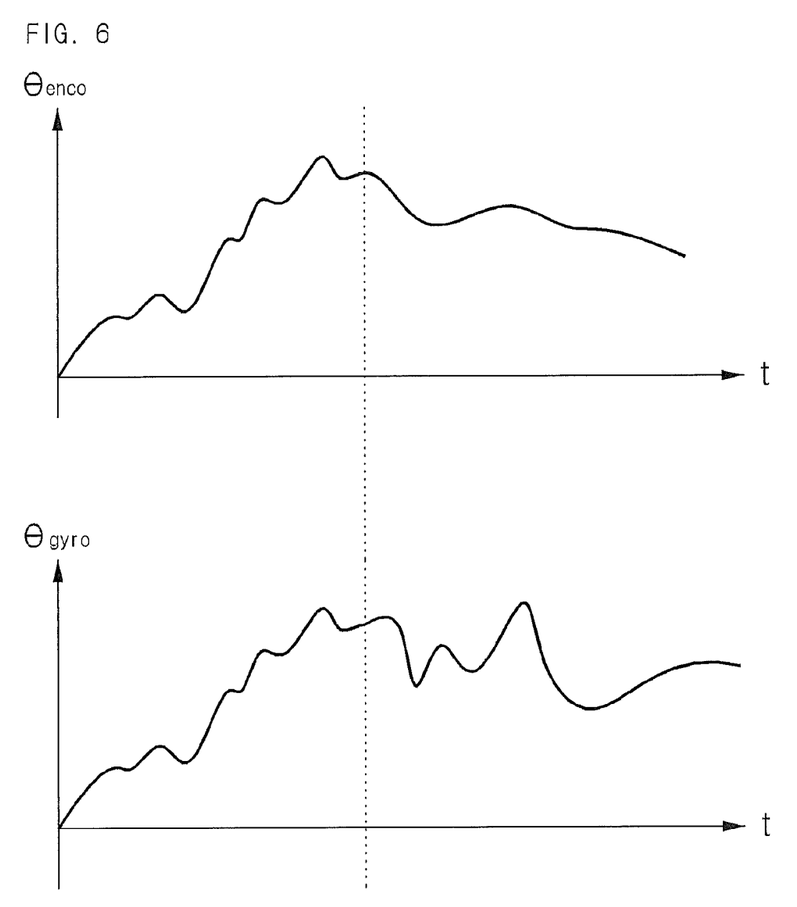
FIG. 6 is a diagram showing a processed estimated rotation angle and a measured rotation angle when the slips are generated at time t1.
Figure 7:
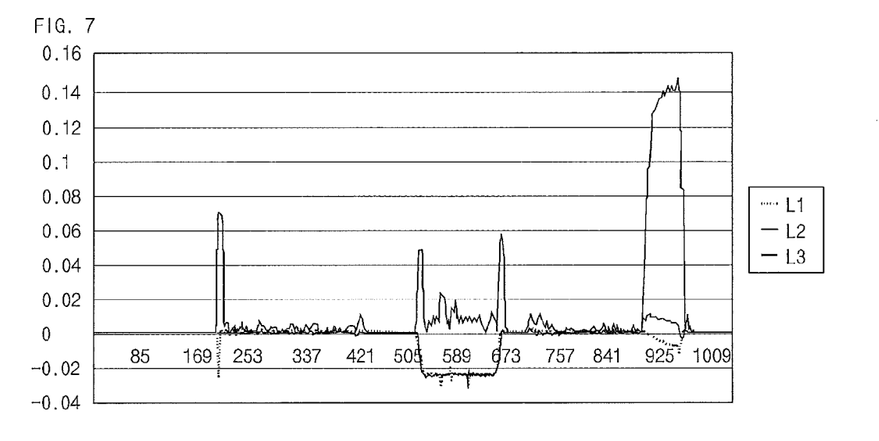
FIG. 7 is a diagram showing a first slip detecting result detected by the method for detecting slips of a mobile robot according to the exemplary embodiment of the present invention.
Figure 8:
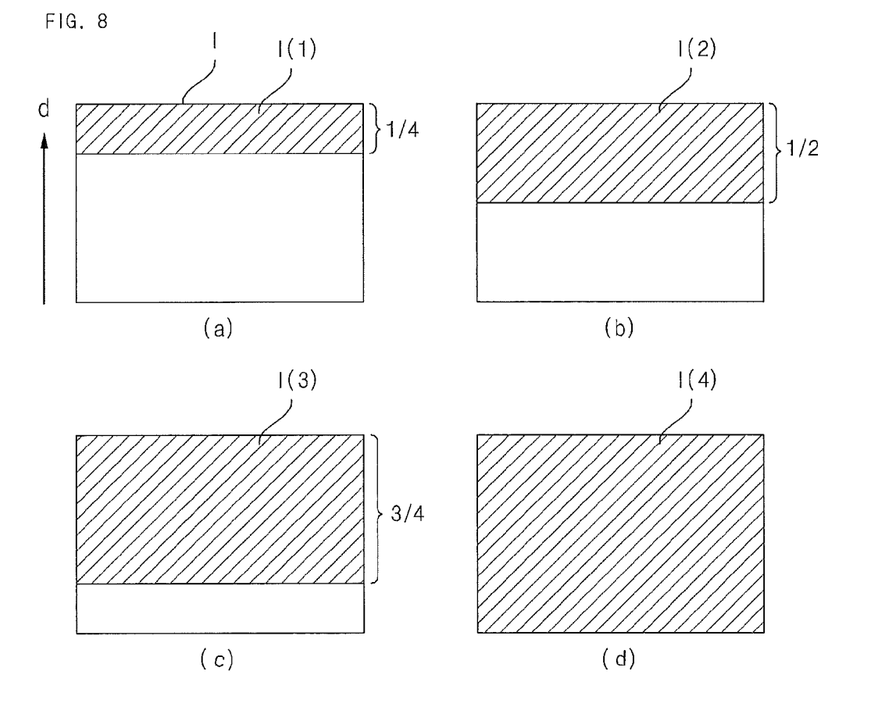
FIG. 8 is a diagram showing a process of determining whether an image acquisition unit is shielded by dividing an acquired image into four based on a heading orientation d of the mobile robot.

FIG. 3 is a flow chart showing a method for detecting slips of a mobile robot according to an exemplary embodiment of the present invention, FIG. 4 is a diagram showing a estimated rotation angle and a measured rotation angle when slips are generated at a left wheel at time t1 during a heading of a mobile robot, FIG. 5 is a diagram showing a rotation angle data detected by the apparatus and the method for detecting slips of a mobile robot according to the exemplary embodiment of the present invention and data generated by processing the rotation angle data, FIG. 6 is a diagram showing a processed estimated rotation angle and a measured rotation angle when the slips are generated at time t1, FIG. 7 is a diagram showing a first slip detecting result detected by the method for detecting slips of a mobile robot according to the exemplary embodiment of the present invention, and FIG. 8 is a diagram showing a process of determining whether an image acquisition unit is shielded by dividing an acquired image into four based on a heading orientation d of the mobile robot.

Referring to FIG. 3, the method for detecting slips of a mobile robot includes: a) estimating a first rotation angle estimated that the mobile robot rotates (S210); b) measuring a second rotation angle generated by actually rotating the mobile robot (S210); and c) detecting a first slip by obtaining the error angle between the first rotation angle and the second rotation angle and calculating the slip direction and the slip angle of the mobile robot based on the error angle (S200).

The method for detecting slips of a mobile robot further includes d) detecting a second slip by calculation variations of at least two sequentially input images (S300).

The method for detecting slips of a mobile robot further includes: e) detecting a type of slips based on the detected first and second slips (S400) and selectively escaping the slip region according to a type of detected slips (S500).

The method for detecting slips of a mobile robot further includes f) recovering a location of the mobile robot based of the slip direction, the slip angle, and the image variations (S600).

The estimation of the first rotation angle (S120) detects a first angular velocity that is the rotation speed of the left wheel driving unit of the mobile robot and a second angular velocity that is the rotation speed of the right wheel driving unit and calculates the first rotation angle based on a difference between the first angular velocity and the second angular velocity and a diameter of the wheel of the mobile robot.

In the detecting of the first slip (S200), the mobile robot escapes the slip region by obtaining the error angle between the first rotation angle and the second rotation angle and comparing the obtained error angle with a reference error angle and determining that the slip is generated in the mobile robot if it is determined that the error angle is larger than the reference error angle (S500).

In this case, the mobile robot 100 moves backward by a predetermined distance or for a predetermined time and then, moves forward in a direction opposite to the slip direction and as a result, escapes the slip region. In this case, the slip detecting unit 210 determines that the slip is generated at the right wheel of the mobile robot when the sign of the error angle has a negative value and the mobile robot 100 move backward by a predetermined distance or for a predetermined time according to the escape control signal of the slip detecting unit and then, move forward in the left direction and as a result, escapes the slip region. However, the slip detecting unit 210 determines that the slip is generated at the left wheel of the mobile robot when the sign of the error angle has a positive value and the mobile robot 100 move backward by a predetermined distance or for a predetermined time according to the escape control signal of the slip detecting unit and then, move forward in the right direction and as a result, escapes the slip region.

The detecting of the first slip will be described in more detail with reference to FIGS. 4 to 6.

First, the first rotation angle estimating unit 220 integrates an angular velocity component of the rotation axis of the robot driver measured by the driving speed detecting unit 230 to output $\theta_{enco}$ that is the rotation angle estimated that the mobile robot 100 rotates. The driving speed detecting unit 230 measures a driving rotation angular velocity wL and wR from the left wheel 151 and the right wheel 152 by a differential driving scheme. The moving speed of the mobile robot may be obtained by multiplying a radius of the wheel by an average of angular velocity. Further, the rotation angle $\theta_{enco}$ may be obtained by multiplying a radius of the wheel by a difference between angular velocities of both wheels. When again integrating the obtained rotation angle, the rotation angle $\theta_{enco}$ may be obtained by the driving speed detecting unit 230 like the encoder.

A linear velocity v and a rotation angular velocity w of the mobile robot 100 may be obtained using the following Equations 1 and 2.

$$v=(wR*rR+wL*rL)/2 \quad (1)$$

$$w=(wR*rR-wL*rL)/B \quad (2)$$

In the above Equations, v and w each are the linear velocity and the rotation angular velocity of the mobile robot, rR is a radius of the right wheel, rL is a radius of the left wheel, wR is a right wheel rotation speed, wL is a left wheel rotation speed, and B is a distance between both wheels.

As shown in FIG. 4, when the mobile robot 100 is headed at an initial location (t=0) or starts to clean and then, a slip is generated at the right wheel 151 at time t=t1, the error angle between the rotation angle $\theta_{enco}$ extracted by the first rotation angle extracting unit 220 and the rotation angle $\theta_{gyro}$ measured by the second rotation angle measuring unit 240 is generated. The slip detecting unit 210 accumulates the above-mentioned error angle.

However, in the exemplary embodiment of the present invention, the rotation angle of the mobile robot is limited to $-\pi$ to $+\pi$ and therefore, when an absolute value of the rotation angle exceeds $\pi$, the sign is changed and thus, the continuous process cannot be performed. Therefore, the pre-processing process is again performed thereon.

The pre-processing process will be described in detail with reference to FIG. 5.

As shown in FIG. 5A, the error angle has a value of $-\pi$ to $+\pi$ and therefore, when the error angle exceeds $+\pi$, has a value of $-\pi$ to 0. Therefore, the error angle has a discontinuous period for the moving time corresponding to $+\pi$ and $-\pi$. Therefore, as shown in FIG. 5B, the slip detecting unit 210 moves the error angle of the discontinuous period in a y-axis direction in parallel and pre-processes the error angle so that the discontinuous period is a continuous period.

The side slip of the mobile robot may be determined by the difference between patterns of $\theta_{gyro}$ and $\theta_{enco}$ for a predetermined time. The slip means that the error between the angle due to the rotation or heading control command and the actual rotation angle occurs due to obstacles in the heading or the rotation path of the mobile robot. That is, as shown in FIG. 6, the patterns of the rotation angles $\theta_{gyro}$ and $\theta_{enco}$ vary at t=t1 when the slip is generated at time t=t1.

However, in order to determine the error of the rotation angle patterns as the slip of the mobile robot, the slip state needs to be maintained for a predetermined time. Therefore, in the case of determining the slip, moving averages are obtained in a predetermined sampling window period for the output data of the rotation angles $\theta_{gyro}$ and $\theta_{enco}$ and then, it is determined whether the slip is present based on a difference between the moving averages. The error angle may be obtained by the following Equation (3).

$$SlipAngle(n) = \sum_{k \in window} (\theta_{enc}(k) - \theta_{gyro}(k)) \quad (3)$$

In the above Equation, SlipAngle (n) is an error angle for the rotation angle output from the first rotation angle measuring unit and the second rotation angle measuring unit for the slip of the side direction.

In order to detect the slip, the difference between the rotation angles $\theta_{gyro}$ and $\theta_{enc}$ according to a predetermined sampling time interval will be described.

Therefore, in order to clearly differentiate the difference between the rotation angles, there is a need to obtain $d\theta_{gyro}/dt$ and $d\theta_{enc}/dt$ that are differential values of each rotation angle. In the exemplary embodiment of the present invention, the differential values from which noise components are removed by applying a Gaussian derivative operator are taken.

The slip detecting unit 210 determines that the slip is generated when the absolute value of the measured SlipAngle is larger than a defined reference value. When the sign of the SlipAngle is positive, the slip is generated from the left of the heading direction of the robot and when the sign of the SlipAngle is negative, the slip is generated from the right thereof. When the slip is generated, the mobile robot does not head in a direction in which the slip is generated to reduce the location error and therefore, the mobile robot slightly moves backward and then, may perform a moving strategy that averts the mobile robot to the opposite direction.

Meanwhile, the location updating of the robot based on the encoder is cancelled for a period in which the slip is generated and therefore, the actual location may be recovered. To this end, two-dimensional plane coordinates of the mobile robot are corrected according to Equations (4) and (5) by using the difference between the direction angle in the encoder space and the gyro space, that is, the accumulated SlipAngle.

$$dx(n)=\cos(SlipAngle(n))*(\omega_L+\omega_R)*r/2*W \quad (4)$$

$$dy(n)=\sin(SlipAngle(n))*(\omega_L+\omega_R)*r/2*W \quad (5)$$

In the above Equation, r is a radius of the wheel, dx(n) and dy(n) each are a location error of an X-axis direction and a Y-axis direction and $(\omega_L+\omega_R)*r/2$ is a moving speed of the mobile robot, and W is a window size applied to row data in order to perform the data processing.

On the other hand, the slip detecting unit 210 compares the image variations with the reference variations to estimate that the mobile robot is congested when the image variations are smaller than the reference variations, thereby calculating a congested frequency.

The slip detecting unit 210 detects the generation of the second slip when the congested frequency is larger than the reference frequency and the speed of the mobile robot based on the error angle is larger than the reference speed.

The image variation calculating unit 250 detects a change in brightness of the image acquired by the image acquisition unit 110 to detect that the mobile robot 100 moves downwardly of obstacles such as a table. For example, the image variation calculating unit 250 detects that the image acquisition unit 110 of the mobile robot 100 is shielded by obstacles by using the brightness average and variance of the acquired image.

When the image acquisition unit 110 is shielded by obstacles, it is impossible to control the location of the mobile robot 100 based on the image. Therefore, the slip detecting unit 210 outputs a signal that controls the movement of the mobile robot 100 based on local information acquired from the inertial sensor 240 such as the gyroscope and the wheel encoder 23.

The above-mentioned inertial sensor 240 detects inertia to confirm a heading direction of the mobile robot 100 and the sensing information of the inertial sensor 240 and the sensing information of the wheel encoder 230 configure the odometry of the mobile robot 100.

A first slip detecting result detected by the method for detecting slips of the mobile robot according to the exemplary embodiment of the present invention will be described with reference to FIG. 7.

In FIG. 7, each of the L1 and L2 is value obtained by differentiating the direction angle in the wheel encoder and gyro sensor space and L3 is a value obtained by summing a difference between the L1 and the L2 for a predetermined time window. When the L3 is larger than a predetermined value, it is sorted into the slip.

As shown in FIG. 7, three peaks are shown on the L3. Here, the first peak corresponds to a case in which a temporary slip is generated due to a slightly rugged floor and a second peak corresponds to a case in which the heading of the wheel encoder and the gyro sensor deviate from each other due to asynchronization when the 180° rotation starts and ends.

However, the third peak corresponds to a case in which the slip defined by the inventors is generated, which uses a threshold of about 1.2 herein. The slip is generated by allow a cleaning robot to perform a trial of strength in a side direction for a predetermined time.

The detecting of the second slip will be described in more detail with reference to FIG. 8.

As shown in FIG. 8, in the detecting of the second slip (S300), the slip detecting unit 210 divides the input image into an N region and increases an object region by 1/N based on the heading direction or the opposite direction of the mobile robot to calculate an average and a variance of each increased region (S330) and when the image is not shielded based on the variations of the average and variance values of each region, the input image is estimated as being congested if it is determined that the image variations are smaller than the reference variations, thereby calculating the congested frequency (S340).

That is, the slip detecting unit 210 detects the generation of the second slip when the congested frequency is larger than the reference frequency and the speed of the mobile robot based on the error angle is larger than the reference speed.

When the mobile robot 100 enters a bottom of the table, the brightness average of an image frame is gradually reduced and thus, a variance value of brightness may be increased or reduced. In the exemplary embodiment of the present invention, as shown in FIG. 7, as a method for reducing calculations, it may determine whether the mobile robot 100 is shielded by obtaining the average and variance of the overall image using the brightness average values of each region divided by quartering the image acquired by the image acquisition unit 110 based on a heading direction d of the mobile robot 100.

In the exemplary embodiment of the present invention, in order to detect a front slip, a vision sensor like a camera has been used, but methods of using a difference between revolutions of the driving wheels using an accelerometer or a coupled driving wheel may be used.

When the camera that is the image acquisition unit is not shielded, a change in a pose of a robot camera is estimated by calculating a difference on the continuous image sequence. However, the difference in background illumination for each acquired image may occur and therefore, a normalized image is obtained according to the following Equations (6) and (7) by obtaining the average and variance of the image and the variations of the image information are measured by the difference of the background illumination.

$$N^k(x,y) = (I(x,y) - \text{avg}(I))/\text{var}(I) \qquad (6)$$

$$NSSD = \Sigma(N^k(x,y) - N^{k-1}(x,y))^2 \qquad (7)$$

Here, the case in which the defined reference value is smaller than the variations, is estimated as the case in which the congestion of the camera pose occurs. However, in order to reliably determine whether the congestion of the pose of the mobile robot is generated, it is determined whether the continuous congestion of the robot is present.

In addition, when the driving speed of the robot is a predetermined value or more and thus, the robot is not in a stop state, it is determined that the front slip is generated or the robot is sandwiched between both sides.

When the slip detecting unit 210 detects the front slip, the slip detecting unit 210 outputs the control signal so as to allow the mobile robot to be headed while avoiding the slip generation region after the mobile robot moves backward by a predetermined distance or for a predetermined time. That is, in the case of the front slip, the mobile robot rotates backward and comes out and thus, may avoid the environment in which the slip may occur and the estimated location of the robot is corrected by multiplying the congested frequency by the moving speed of the robot and retreating backward.

That is, the mobile robot using the SLAM scheme in which the single camera to which the present invention is applied is mounted processes 2 to 3 frames per second and thus, there is a need to correct the coordinate information of the falsely registered landmark on an extended Kalman filter (EKF) map while the front slip is detected by a visual odometry. Therefore, the error occurring due to the slip may be calibrated by the following observing measurement by increasing covariance for the landmarks registered in a landmark initialization buffer. Further, when the side slip is detected, it may be processed at a relatively short time and therefore, the current location information of the mobile robot is calibrated at the time of updating the EKF.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. An apparatus for detecting slips of a mobile robot, comprising:
   a first rotation angle estimating unit that estimates a first rotation angle estimated that the mobile robot rotates;
   a second rotation angle measuring unit that measures a second rotation angle generated by an actual rotation of the mobile robot;
   an image variation calculating unit that calculates variations of at least two sequential images acquired from an image acquisition unit; and
   a slip detecting unit that detects a type of slips by calculating a slip direction and a slip angle of the mobile robot based on an error angle of the first and second rotation angles and the image variations and outputs different escape control signals for allowing the mobile robot to escape a slip region according to the type of detected slips,
   wherein the slip detecting unit compares the image variations with reference variations to estimate that the mobile robot is congested when the image variations are smaller than the reference variations, thereby calculating a congested frequency.

2. The apparatus of claim 1, wherein the slip detecting unit outputs a recovery signal of a location of the mobile robot for the error of location information at the time of the slip generation based on the slip direction, the slip angle, and the image variations.

3. The apparatus of claim 1, wherein the slip detecting unit detects a generation of a first slip in the mobile robot when the error angle is larger than a reference error angle.

4. The apparatus of claim 3, wherein the slip detecting unit determines that a slip is generated at a right wheel of the mobile robot when a sign of the error angle has a negative value at the time of detecting the slip and outputs an escape control signal that allows the mobile robot to move backward by a predetermined distance or for a predetermined time and then, move forward in a left direction.

5. The apparatus of claim 3, wherein the slip detecting unit determines that a slip is generated at a left wheel of the mobile robot when a sign of the error angle has a positive value at the time of detecting the slip and outputs an escape control signal that allows the mobile robot to move backward by a predetermined distance or for a predetermined time and then, move forward in a right direction.

6. The apparatus of claim 1, wherein the slip detecting unit detects a generation of a second slip when the congested frequency is larger than a reference frequency and a speed of the mobile robot based on the error angle is larger than a reference speed.

7. A method for detecting slips of a mobile robot, comprising:
   a) estimating a first rotation angle estimated that the mobile robot rotates;
   b) measuring a second rotation angle generated by an actual rotation of the mobile robot; and
   c) detecting a first slip by obtaining an error angle of the first rotation angle and the second rotation angle and calculating a slip direction and a slip angle of the mobile robot based on the error angle, and d) detecting a second slip by calculating variations of at least two sequentially input images, wherein the detecting of the second slip includes:

dividing the input image into N regions and increasing an object region by 1/N based on a heading direction or an opposite direction of the mobile robot to calculate an average and a variance of each increased region; and estimating that the input image is congested to calculate a congested frequency when the image variations is smaller than reference variations if it is determined that the image is not shielded based on the variations of the average and variance values of each region.

8. The method of claim 7, further comprising: e) detecting a type of slips based on the detected first slip and second slip and selectively escaping a slip region according to the type of detected slips.

9. The method of claim 8, further comprising: f) recovering a location of the mobile robot based on the slip direction, the slip angle, and the image variations.

10. The method of claim 9, wherein the estimating of the first rotation angle includes:

detecting a first angular velocity that is a rotation speed of a left wheel driving unit of the mobile robot and a second angular velocity that is a rotation speed of a right wheel driving unit; and calculating the first rotation angle based on a difference between the first angular velocity and the second angular velocity and a diameter of a wheel of the mobile robot.

11. The method of claim 10, wherein the detecting of the first slip includes:

obtaining an error angle between the first rotation angle and the second rotation angle and comparing the error angle with a reference error angle; and determining that a slip is generated in the mobile robot when the error angle is larger than the reference error angle to allow the mobile robot to escape the slip region.

12. The method of claim 11, wherein in the escaping of the slip region, the mobile robot moves backward by a predetermined distance or for a predetermined time and then, moves forward in a direction opposite to the slip direction so as to escape the slip region.

13. The method of claim 11, wherein in the escaping of the slip region, the mobile robot moves backward by a predetermined distance or for a predetermined time and then, moves forward in a left direction so as to escape the slip region by determining that a slip is generated at a right wheel of the mobile robot when a sign of the error angle has a negative value.

14. The method of claim 11, wherein in the escaping of the slip region, the mobile robot moves backward by a predetermined distance or for a predetermined time and then, moves forward in a right direction so as to escape the slip region by determining that a slip is generated at a left wheel of the mobile robot when a sign of the error angle has a positive value.

15. The method of claim 11, wherein the error angle has a value between +180° and −180° based on an initial location of the mobile robot.

16. The method of claim 15, wherein when the error angle has a discontinuous period for the moving time of the mobile robot, an error angle of the discontinuous period moves in a y-axis direction in parallel to pre-process the error angle so that the discontinuous period is a continuous period.

17. The method of claim 9, wherein in the detecting of the second slip, when the congested frequency is larger than a reference frequency and a speed of the mobile robot is larger than a reference speed based on the error angle, the generation of the second slip is detected.

* * * * *